US008438263B2

(12) United States Patent
Sivasubramanian et al.

(10) Patent No.: US 8,438,263 B2
(45) Date of Patent: *May 7, 2013

(54) LOCALITY BASED CONTENT DISTRIBUTION

(75) Inventors: Swaminathan Sivasubramanian, Seattle, WA (US); David R. Richardson, Seattle, WA (US); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,714

(22) Filed: Sep. 13, 2012

(65) Prior Publication Data
US 2013/0007117 A1 Jan. 3, 2013

Related U.S. Application Data

(63) Continuation of application No. 13/296,189, filed on Nov. 14, 2011, now Pat. No. 8,275,874, which is a continuation of application No. 13/170,102, filed on Jun. 27, 2011, now Pat. No. 8,060,561, which is a continuation of application No. 12/060,124, filed on Mar. 31, 2008, now Pat. No. 7,970,820.

(51) Int. Cl.
*G06F 15/173* (2006.01)
(52) U.S. Cl.
USPC ............ 709/223; 709/203; 709/217; 709/224
(58) Field of Classification Search .................. 709/231, 709/223, 224, 229, 203, 217, 219
See application file for complete search history.

(56) References Cited

U.S. PATENT DOCUMENTS 5,341,477 A * 8/1994 Pitkin et al. .................. 709/226
5,611,049 A 3/1997 Pitts
(Continued)

FOREIGN PATENT DOCUMENTS

| CN | 1422468 A | 6/2003 |
|---|---|---|
| WO | WO 2007/007960 A1 | 1/2007 |
| WO | WO 2012/044587 A1 | 4/2012 |

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

(Continued)

*Primary Examiner* — Lashonda Jacobs
(74) *Attorney, Agent, or Firm* — Knobbe, Martens, Olson & Bear, LLP

(57) ABSTRACT

A system and method for content distribution are provided. A content provider generates a network topology having one or more subnetworks made up of content sources. The content provider segments content, such as applications, into segments for distribution. The content provider then distributes the content such that for each identified subnetwork, each content segment is distributed to a content source. Subsequent, client computing device requests for content can be serviced by selecting a content source in a particular subnetwork selected for delivering the requested content to the client computing device to minimize traffic flow of the requested content through the nodes of the distribution network.

26 Claims, 10 Drawing Sheets

U.S. PATENT DOCUMENTS

| | | |
|---|---|---|
| 5,774,660 A * | 6/1998 | Brendel et al. ............... 709/201 |
| 5,892,914 A | 4/1999 | Pitts |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 * | 9/2006 | Leighton et al. ............... 709/219 |
| 7,117,262 B2 | 10/2006 | Bai et al. |
| 7,133,905 B2 * | 11/2006 | Dilley et al. ................. 709/219 |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 * | 7/2007 | Wein et al. ................ 709/214 |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 * | 12/2007 | Uysal ...................... 709/245 |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 * | 12/2008 | Taylor et al. ................. 709/245 |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 * | 6/2009 | Chase et al. ................. 709/238 |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,321,568 B2 | 11/2012 | Sivasubramanian et al. |
| 2001/0032133 A1 | 10/2001 | Moran |
| 2001/0034704 A1 | 10/2001 | Farhat et al. |
| 2001/0049741 A1 * | 12/2001 | Skene et al. ................. 709/232 |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |

| Publication No. | Date | Name |
|---|---|---|
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124098 A1 | 9/2002 | Shaw |
| 2002/0129123 A1 | 9/2002 | Johnson et al. |
| 2002/0138286 A1* | 9/2002 | Engstrom ............. 705/1 |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0174648 A1 | 9/2003 | Wang et al. |
| 2003/0182413 A1 | 9/2003 | Allen et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044791 A1 | 3/2004 | Pouzzner |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1* | 7/2004 | Trossen ............. 709/203 |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0216569 A1 | 9/2005 | Coppola et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1* | 12/2005 | Gunaseelan et al. ............. 705/59 |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0063534 A1 | 3/2006 | Kokkonen et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0120385 A1 | 6/2006 | Atchison et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0227740 A1 | 10/2006 | McLaughlin et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259984 A1 | 11/2006 | Juneau |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1 | 3/2007 | Dilley et al. |
| 2007/0076872 A1 | 4/2007 | Juneau |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1* | 8/2007 | Wong et al. ............. 370/252 |
| 2007/0208737 A1* | 9/2007 | Li et al. ............. 707/6 |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0253377 A1 | 11/2007 | Janneteau et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |

| | | |
|---|---|---|
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1* | 3/2008 | Crayford ............................ 725/86 |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1* | 6/2008 | Afergan et al. ............... 709/218 |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1* | 12/2008 | Gouge et al. ................. 717/173 |
| 2008/0319862 A1 | 12/2008 | Golan et al. |
| 2009/0013063 A1* | 1/2009 | Soman ............................. 709/223 |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1* | 8/2009 | Hudson et al. ................. 709/231 |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2010/0005175 A1* | 1/2010 | Swildens et al. ............... 709/226 |
| 2010/0011061 A1* | 1/2010 | Hudson et al. ................. 709/204 |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Baglioni et al., "Preprocessing and Mining Web Log Data for Web Personalization", LNAI 2829, 2003, pp. 237-249.
First Office Action in Chinese Application No. 200980119993.1 dated Jul. 4, 2012.
First Office Action in Chinese Application No. 200980119995.0 dated Jul. 6, 2012.
International Search Report and Written Opinion in PCT/US2011/053302 mailed Nov. 28, 2011 in 11 pages.
International Search Report and Written Opinion in PCT/US2011/061486 mailed Mar. 30, 2012 in 11 pages.
Liu et al., "Combined mining of Web server logs and web contents for classifying user navigation patterns and predicting users' future requests," Data & Knowledge Engineering 61 (2007) pp. 304-330.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Supplementary European Search Report in Application No. 09727694.3 mailed Jan. 30, 2012 in 6 pages.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
Singapore Examination Report in Application No. 201006837-7 mailed May 16, 2012.
Singapore Written Opinion in Application No. 201006836-9, mailed Apr. 30, 2012 in 10 pages.

* cited by examiner

LOCALITY BASED CONTENT DISTRIBUTION

CROSS REFERENCE TO RELATED APPLICATIONS

This application is a continuation of U.S. patent application Ser. No. 13/296,189, which is in turn a continuation of U.S. patent application Ser. No. 13/170,102, which is now U.S. Pat. No. 8,060,561, entitled "LOCALITY BASED CONTENT DISTRIBUTION" and filed on Jun. 27, 2011, which is in turn a continuation of U.S. patent application Ser. No. 12/060,124, which is now U.S. Pat. No. 7,970,820, entitled "LOCALITY BASED CONTENT DISTRIBUTION" and filed on Mar. 31, 2008, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

In one embodiment, a content provider can utilize additional content sources as part of a content distribution network to provide data to client computing devices. Examples of the additional content sources that can be part of the content distribution network include network-based storage resources or points of presence, edge network computing devices, peer or registered computing devices, and the like. Traditional content distribution networks can become deficient, however, with the repetitive transmission of requested content (per a client computing device request) across network resource nodes (e.g., routers). For example, randomized selection of a distributed network content source can result the transmission of content across a number of distribution network nodes. Such inefficiencies can result in content distribution bottlenecks for the content distribution network.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the management and processing of resource requests made by client computing devices. Specifically, aspects of the disclosure will be described with regard to the utilization, by a content provider, of topology information to define various subnetworks of content sources for a content distribution network. The content provider then distributes content to the content sources in each of the subnetworks such that content can be made available to requesting client computing devices from any of the subnetworks.

In one embodiment, as client computing device content requests are processed, the content provider provides an identification of content sources that are capable of providing the requested content (or portions thereof). The client computing devices can then request the content (or content portions) from the identified content sources. Alternatively, the client computing devices can identify the appropriate content providers without requiring the identification information from the content provider, such as through the utilization of a communication protocol. In both embodiments, the content sources that are identified to receive the content request are selected in a manner to minimize the network traffic associated with the content request through the nodes of the content provider distribution network. Although various aspects of the disclosure will be described with regard to illustrative examples and embodiments, one skilled in the art will appreciate that the disclosed embodiments and examples should not be construed as limiting.

Figure 1:
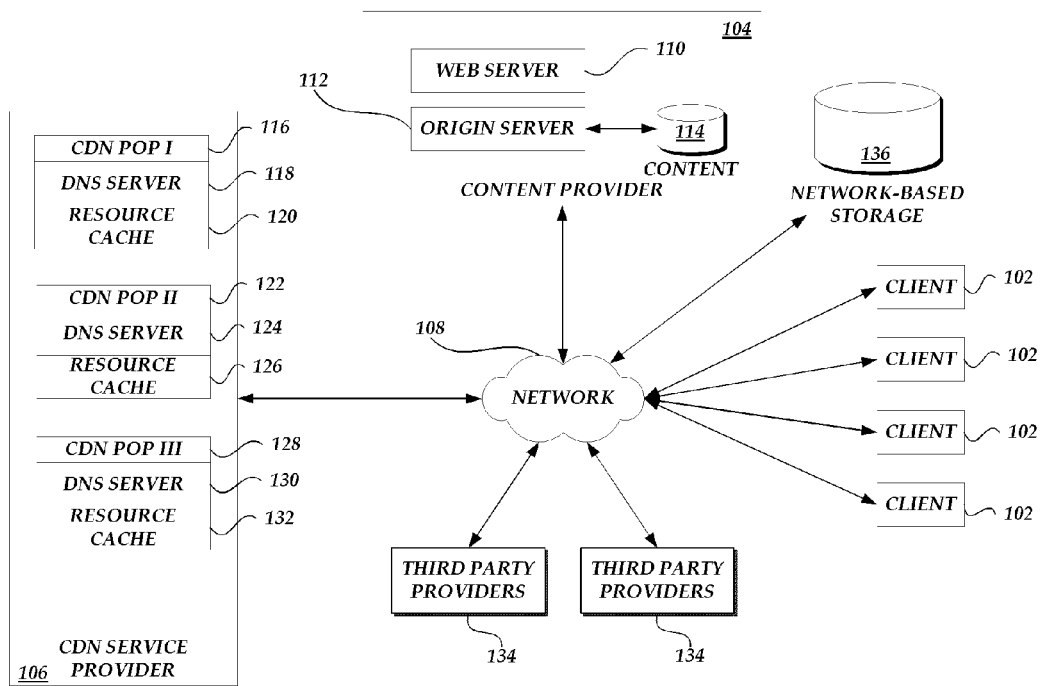
FIG. 1 is a block diagram illustrative of content delivery environment including a number of client computing devices, content provider, various third party content providers, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. Although the client computing devices 102 may be described in accordance with a client-server network model, one skilled in the relevant art will appreciate that the client computing devices 102 correspond to computing devices acquiring content from another computing devices, including, but not limited to, client-server network models, peer-to-peer network models, and the like.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the distributed network content sources. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

The content delivery environment 100 can further include a number of third party content providers 134 that are registered with the content provider 104 (directly or indirectly). The content provider 104 can utilize the third party content providers 134 to provide content, or content portions, as peer computing devices to requesting client computing devices 102 as will be described in greater detail below. The third party content providers 134 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. Additionally, the third party content providers 134 can include additional hardware and/or software components for delivering content to other computing devices via the communication network 108, such as Web server computing device, proxy server computing device, etc. As will be explained in greater detail below, the third party content providers 134 can obtain content specifically for distribution to client computing devices 102. In still a further embodiment, the third party content providers 134 can also be client computing devices 102 that have registered with the content provider 104 and can provide previously downloaded content to other client computing devices 102.

Even further, the content delivery environment 100 can include a network-based memory 136 which can be utilized by the content provider 104 and/or CDN service provider 106 to manage content.

One skilled in the relevant art will appreciate that the components and configurations provided in FIG. 1 are illustrative in nature. Additionally, one skilled in the relevant art will appreciate that the CDN provider 106, third party providers 134 and/or network-based storage 136 may be omitted altogether from the content delivery environment 100. Still further, the CDN provider 106, third party providers 134 and/or network-based storage 136 may be affiliated directly with the content provider 104 or indirectly serve as at least partial content stores in the content distribution network. Accordingly, additional or alternative components and/or configurations, especially regarding the additional components, systems and subsystems for facilitating communications may be utilized.

With reference now to FIGS. 2-5, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
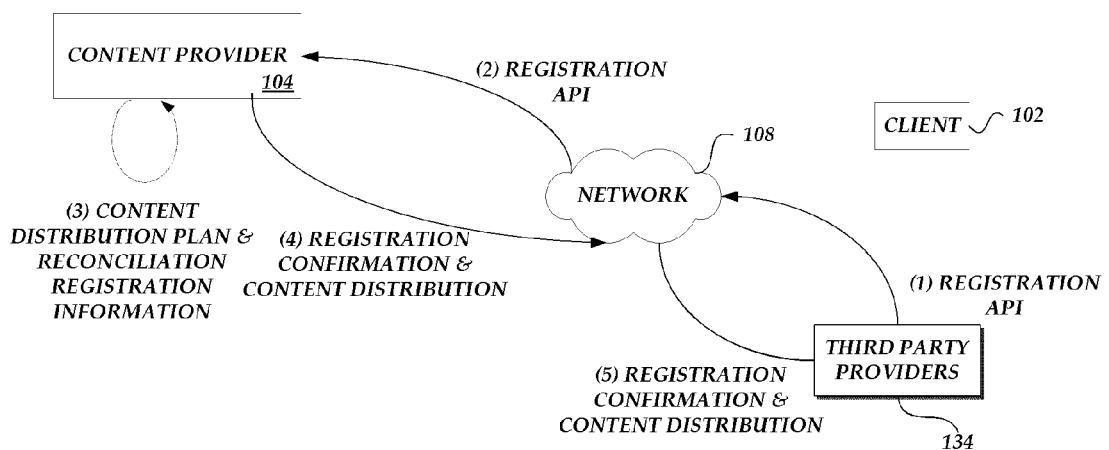
FIG. 2 is a block diagram of the content delivery environment of FIG. 1 illustrating the registration of third party content provider with a content provider.

With reference to FIG. 2, an illustrative interaction for registration of third party content providers 134 with the content provider 104 will be described. As will be described in greater detail below, the content provider 104 can utilize the third party content providers 134 to provide content to requesting client computing devices. As illustrated in FIG. 2, the content hosting registration process begins with registration of the third party content providers 134 with the content provider 104. In an illustrative embodiment, the third party content providers 134 utilize a registration application program interface ("API") to register with the content provider 104 such that the third party content providers 134 can provide content on behalf of the content provider 104 or the CDN service provider 106 on behalf of the content provider 104. The registration API includes the identification of the computing devices associated with the third party content providers 134 that will provide requested resources on behalf of the content provider 104. Additionally, the registration API can include additional identification information used by the content provider 104 to identify content previously downloaded by the third party content providers 134 and that is available for downloading by other client computing devices 102.

One skilled in the relevant art will appreciate that upon registration, the content provider 104 can begin to direct requests for content from client computing devices 102 to the third party content providers 134. With continued reference to FIG. 2, upon receiving the registration API, the content provider 104 obtains and processes the registration information. In an illustrative embodiment, the content provider 104 can use the registration information to identify the criteria used to direct client computing device content requests to the specific third party content provider 134. As will be described in greater detail below, in one embodiment, the content provider 104 selects content sources, such as third party content providers 134, as a function of a model of the network topology of the content provider's distribution network. For example, the content provider 104 can select a content source according to a network proximity to a client computing device 102 that mitigates the number of distribution network nodes that are traversed by data exchanged between the client computing device and an identified content source, such as a third party content provider 134.

In another embodiment, the content provider 104 can use additional information, in conjunction with the network topology information, to select an appropriate third party registration server (and other content source). The content provider 104 can also use the registration information to identify content previously downloaded by the third party content providers 134 (such as acting in the capacity as a client computing device 102). In still a further embodiment, the content provider 104 can also use the registration information to establish, or otherwise confirm, financial or account information that the content provider 104 will utilize to reconcile with the third party content provider 134 for content provided to client computing devices. For example, the financial or account information can correspond to account information for a particular financial institution, user identifiers for additional third party services utilized to exchange value between parties, or other information utilized in accordance with a particular type of reconciliation used between the content provider 104 and the third party content provider 134. One skilled in the relevant art will appreciate that various types of additional information may be generated or collected by the content provider 104.

The content provider 104 returns a confirmation of the registration of the third party content provider 134. Additionally, in an illustrative embodiment, the content provider 104 can begin providing content to the third party content provider 134, or instructions for downloading content from a cache server component of a POP, such as POP 116, of a CDN provider 106. An illustrative routine for the distribution of content to content sources, such as third party content providers 134, will be described below with regard to FIG. 6. The third party content provider 134 obtains the confirmation and begins performing any additional activity in correspondence with the confirmed registration, such as preparing previously downloaded content or downloading identified content in anticipation of incoming requests from the client computing devices 102.

Figure 3:
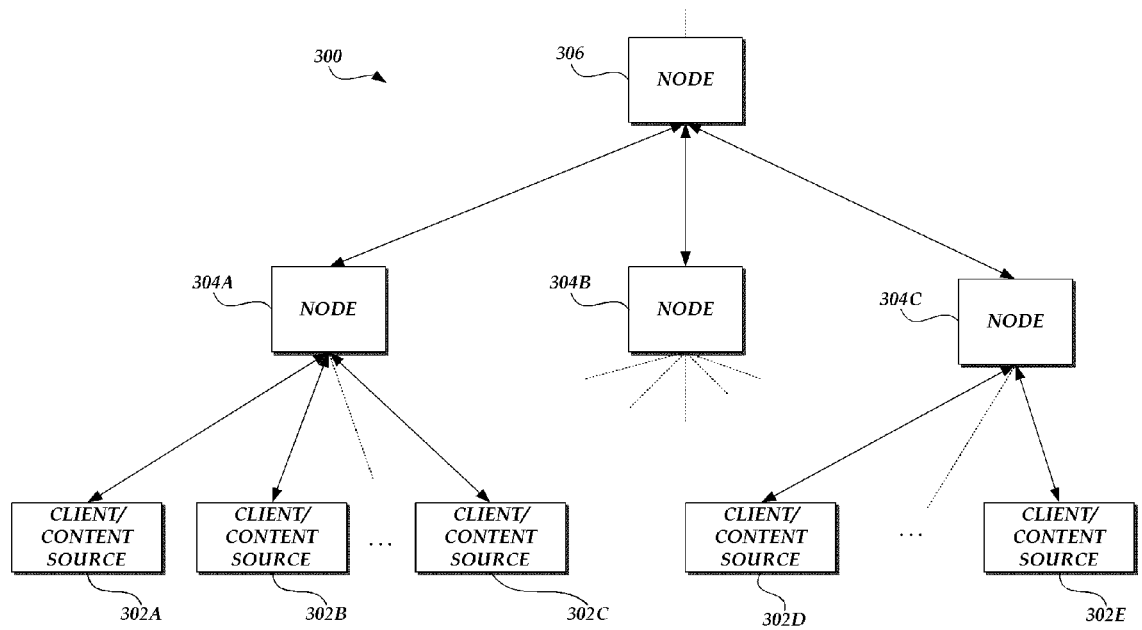
FIG. 3 is a block diagram illustrative of a model of a content provider distribution network.

Turning now to FIG. 3, in an illustrative embodiment, the content provider 104 may utilize network topology information to generate a model of the distribution network 300 for purposes of distributing content to content sources and associating client computing devices with content sources. As illustrated in FIG. 3, the model 300 can correspond to a multi-level network in which a plurality of computing devices are grouped into a first level. The computing devices can correspond to content sources that provide content to other computing devices. Additionally, the computing devices can also correspond to client computing devices 102 that request content from content sources. Thus, each computing device may act as a content source only, a client computing device only, or a combination of content source and client computing device. Accordingly, the computing devices will be generally referred to as client/content sources 302. The first level nodes (nodes 302A-302E) are grouped according to shared nodal connections in the distribution network, such as nodes 304A, 304B and 304C. As illustrated in FIG. 3, nodes 304A-304C represent a second level in the distribution network model 300. Nodes 304A-304C may correspond to networking equipment, such as routers, switch, etc. In such an embodiment, router node 304A would be considered a parent node to children client/content source nodes 302A, 302B and 302C and router node 304C would be considered a parent node to children client/content source nodes 302D and 302E.

In a similar manner, the second level nodes, nodes 304A-C, may also be grouped together to form a subnetwork of the distribution network for providing content based on common network node configurations. For example, nodes 304A-C may represent children nodes of a datacenter node, such as node 306. Still further, third level node, such as node 306, may be grouped with other node(s) not illustrated in the distribution network model 300 to be considered as a subnetwork of the distribution network for providing content. In an illustrative embodiment, the distribution network model 300 can include any number of levels and subnetworks. Accordingly, the nodes and subnetworks illustrated in FIG. 3 are illustrative in nature and should not be construed as limiting.

As previously described, the content provider 104 can distribute content to the content sources 302 in the defined distribution network subnetworks such that copies of the content, which may be segmented, can be found and provided to client computing devices 102 from the subnetworks. Accordingly, the content provider 104 may distribute content to the various third party computing devices in the subnetworks as part of the processing of client computing device requests or in anticipation of client computing device requests. For example, if a content provider 104 would need to distribute an application, the content provider would provide an identification of the various subnetworks in the distribution network (such as the subnetworks represented by nodes 302A-302C and 302D-302E, respectively) and distribute the application to the subnetwork as a whole. In turn, a copy of the application, either in whole or as a set of content segments, would reside in one or more of the client/content sources 302. An illustrative routine for distributing content will be described with regard to FIG. 6.

In an illustrative embodiment, the content provider 104 selects (or provides an identification of) specific subnetwork (s) utilized to provide the content to the client computing devices 102 as a function of a network proximity to the client computing device among other factors. With reference to FIG. 3, the selection of a subnetwork can correspond to an identification of the specific subnetwork (and a corresponding content source) in which the client computing device 102 resides. In such an embodiment, the information flow through the nodes of the distribution network associated with the delivery of content would be minimized because of the close nodal proximity. For example, assume that if the content provider 104 would wish to distribute an application to every computing device in the distribution network, a copy of the application would initially be distributed to a single computing device in each subnetwork (as described above). In accordance with the present disclosure, each additional client/content source could then attempt to acquire the application from another client/content source within the same defined subnetwork. By limiting content sources to within the same defined subnetwork, or a subnetwork with a close network proximity, the amount of information corresponding to the application passed through other nodes in the distribution would be minimized. If the client computing device and the content sources are child nodes, the responsive content information would only pass through one additional node, such as a router node.

Figure 4:
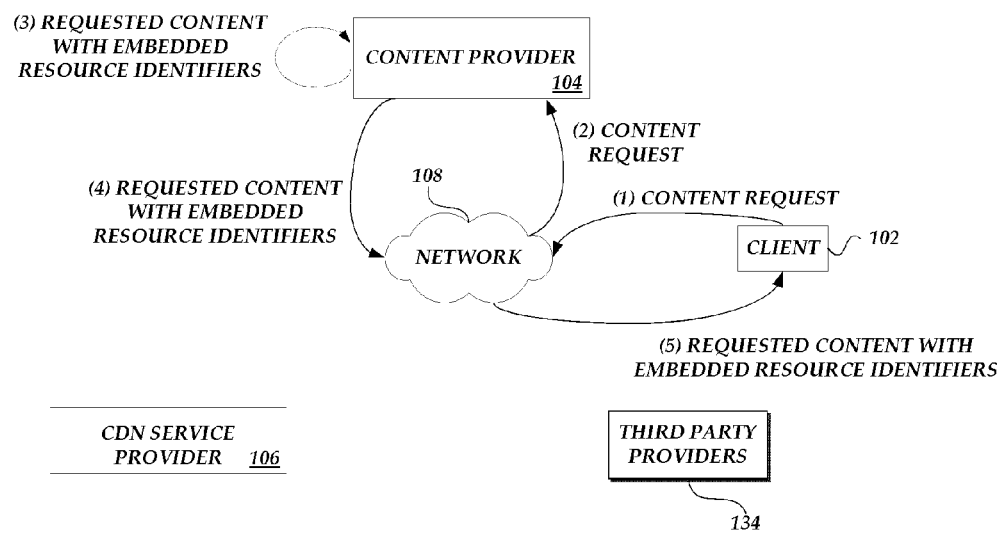
FIG. 4 is a block diagram of the content delivery environment of FIG. 1 illustrating the generation and processing of a content request from a client computing device to a content provider.

With reference now to FIG. 4, after completion of the registration processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that correspond to resource objects that should be obtained by the client computing device 102 as part of the processing of the requested content. The embedded resource identifiers can be generally referred to as resource identifiers or resource URLs. In one embodiment, the client computing device 102 may process the requested content and automatically begin requesting the resources identified by the resource URLs. Alternatively, the requested content may correspond to a list of available content, in which the client computing device 102 generates requests for the content (as represented by resource URLs) in response to a user selection. Still further, although the client computing device 102 requests have been described in conjunction with a Web page content request, one skilled in the relevant art will appreciate that the content request may originate from a number of other sources/approaches and the content request interaction illustrated in FIG. 4 may be omitted.

Figure 5A:
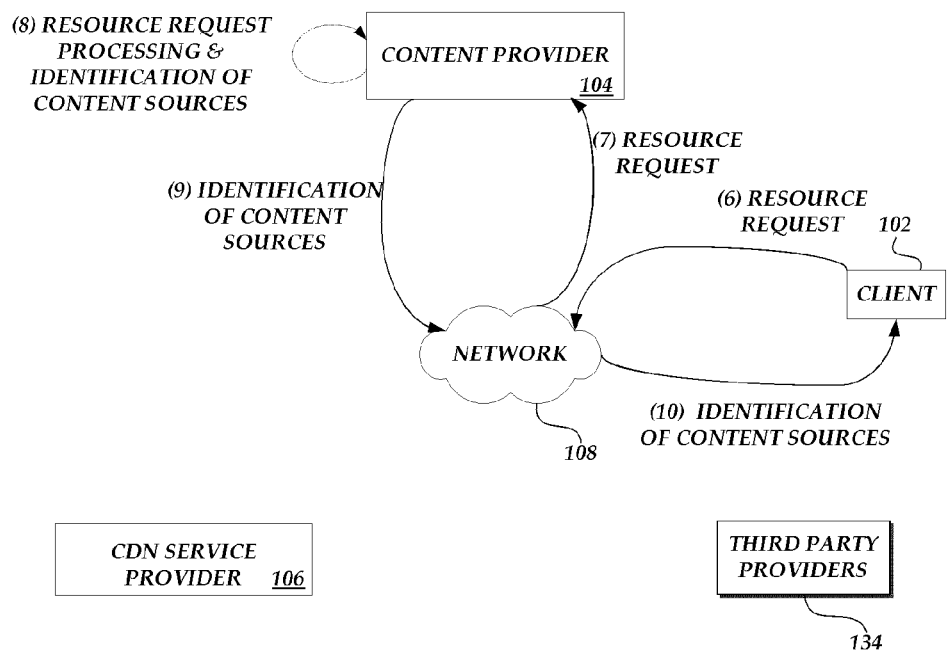
FIGS. 5A-5C are block diagrams of the content delivery environment of FIG. 1 illustrating the generation of content requests by a client computing device to a content source corresponding to content sources of a subnetwork corresponding to a content provider distribution network.
Figure 5B:
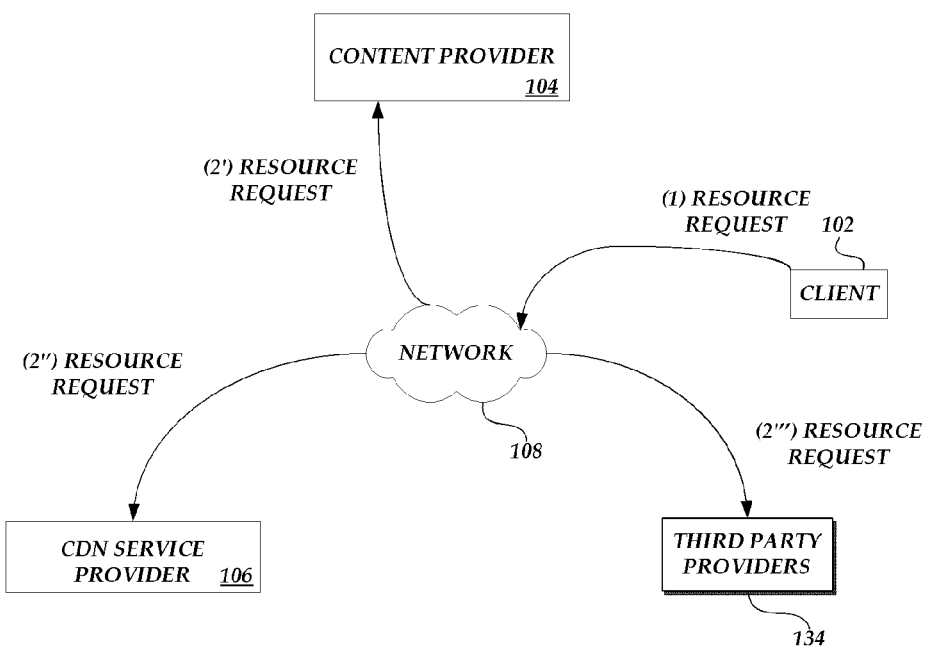

With reference now to FIGS. 5A and 5B, alternative steps implemented by a client computing device 102 to obtain requested content (e.g., content corresponding to the embedded URLs) from the content provider 104 will be described. With reference to FIG. 5A, the client computing device 102 initiates a resource request. The resource request can correspond to a variety of network communication protocols, including but not limited, to hypertext transfer protocol ("HTTP"), file transfer protocol ("ftp"), and any one of a variety of communications protocols. In turn, the content provider 104 processes the content request and provides identification information that includes a set of network addresses of content sources. Examples of the identification information could be in the form of a list of content sources, metadata identifying content source (e.g., a torrent file), and the like. The identification information is then returned to the client computing device 102. As previously described, in one embodiment, the identification information generated by the content provider 104 can be processed in an attempt to minimize the traffic through the distribution network nodes.

With continued reference to FIG. 5A, in addition to the set of network addresses, the content provider 104 also provides reconciliation information, such as electronic tokens, for use by the third party content providers 134. In an illustrative embodiment, the reconciliation information will be provided accompanied by any resource request submitted by the client computing device 102 to an identified third party content provider 134. For additional security/integrity purposes, the content provider 104 can include additional information in the electronic tokens, such as a client computing device identifier information, timestamp information, third party content provider 134 identifiers, information based on such information, and the like. For example, a client computing device identifier can be incorporated into the electronic information, such as via a hashing algorithm, in an effort to limit unauthorized duplication of the electronic tokens or fraudulent or repetitive reconciliations by a third party content provider 134. One skilled in the relevant art will appreciate that any one of a variety of electronic token, micropayment, or credit management methodologies may be incorporated in the content delivery environment 100 for reconciling content provided by a third party content provider 134.

With reference now to FIG. 5B, the client computing device 102 utilizes the information provided by the content provider 104 and transmits content requests to the identified content sources. If the content source is a third party content provider 134, the content requests can include the reconciliation information to be used by the third party content provider 134 to reconcile with the content provider 104 (either directly or through a proxy).

Figure 5C:
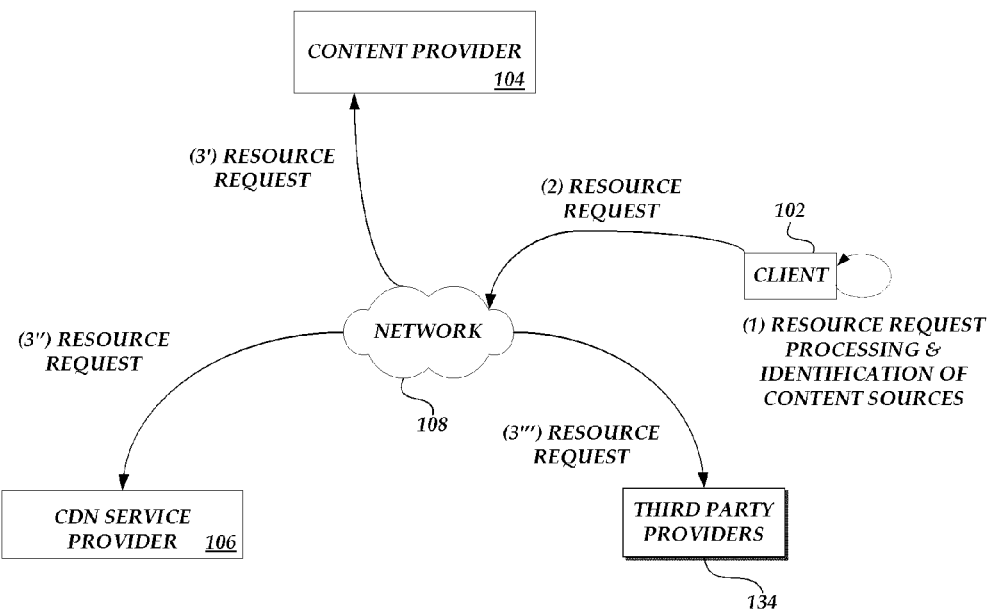

With reference now to FIG. 5C, in an alternative embodiment, the client computing device 102 does not transmit an initial request to the content provider 104 to obtain an identification of the available content sources. In this embodiment, the client computing device 102 may implement some additional processing that facilitates the identification of the appropriate content source. For example, the client computing device could utilize a hashing algorithm that determines the content source based, as least in part, on a hash of a client identifier or client identification information. As described in FIG. 5C, the client computing device 102 then utilizes the information it calculated and transmits content requests to the identified content sources. If the content source is a third party content provider 134, the content requests can include the reconciliation information to be used by the third party content provider 134 to reconcile with the content provider 104 (either directly or through a proxy).

Figure 6:
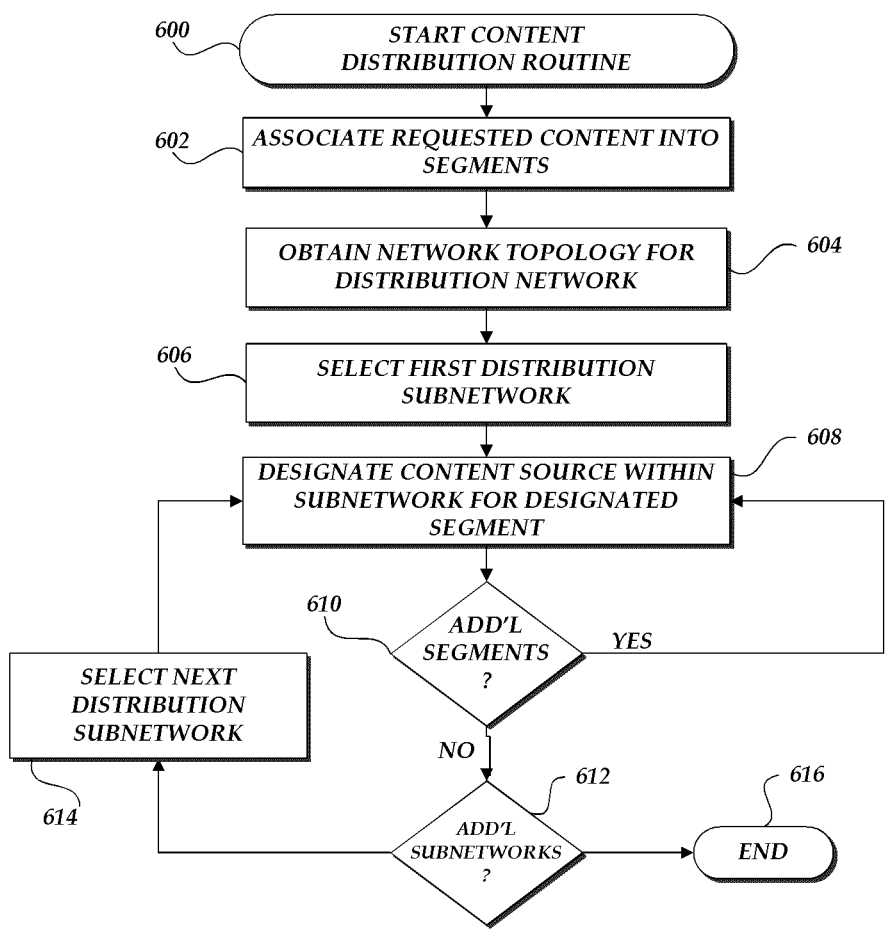
FIG. 6 is a flow diagram illustrative of a content distribution routine implemented by a content provider.

With reference now to FIG. 6, an illustrative content distribution routine 600 implemented by the content provider 104 will be described. At block 602, the content provider 104 associates the requested content into a set of segments. As previously described, the requested content can be subdivided into a number of content segments or content chunks utilizing a variety of methodologies. At block 604, the content provider 104 obtains network topology information for the distribution network. As illustrated in FIG. 3, in an illustrative embodiment, the network topology information can correspond to a model 300 that defines various distribution network subnetworks including one or more client/content sources 302.

At block 606, the content provider 104 selects a first distribution subnetwork as defined in the model 300. As previously described, the definition of the subnetwork can correspond to a grouping of nodes of the distribution network and can correspond to more than one level of a distribution network. At block 608, the content provider 104 designates at least one client/content source within the subnetwork to be distributed the designated content segment. At decision block 610, a test is conducted to determine whether additional content segments in the content are to be distributed. If so, the routine 600 returns to block 606 to designate at least client/content source to receive the additional segments. In one embodiment, the same client/content source within a single subnetwork may be utilized to maintain all the content segments. Alternative, in another embodiment, the content segments may be distributed to various client/content sources within a subnetwork in accordance with a variety of distribution techniques including, but not limited, round robin selection, random selection, load balancing, etc.

Once all the content segments have been distributed within a subnetwork, at decision block 612, a test is conducted to determine whether additional subnetworks exist in the distribution network. If so, at block 614, the content provider 104 selects a next subnetwork in the distribution network and the routine 600 returns to block 606 in which all the content segments will be distributed to clients/content sources in the next subnetwork. Once there are no remaining subnetworks in the distribution network at decision block 612, the routine 600 terminates at block 616.

Figure 7:
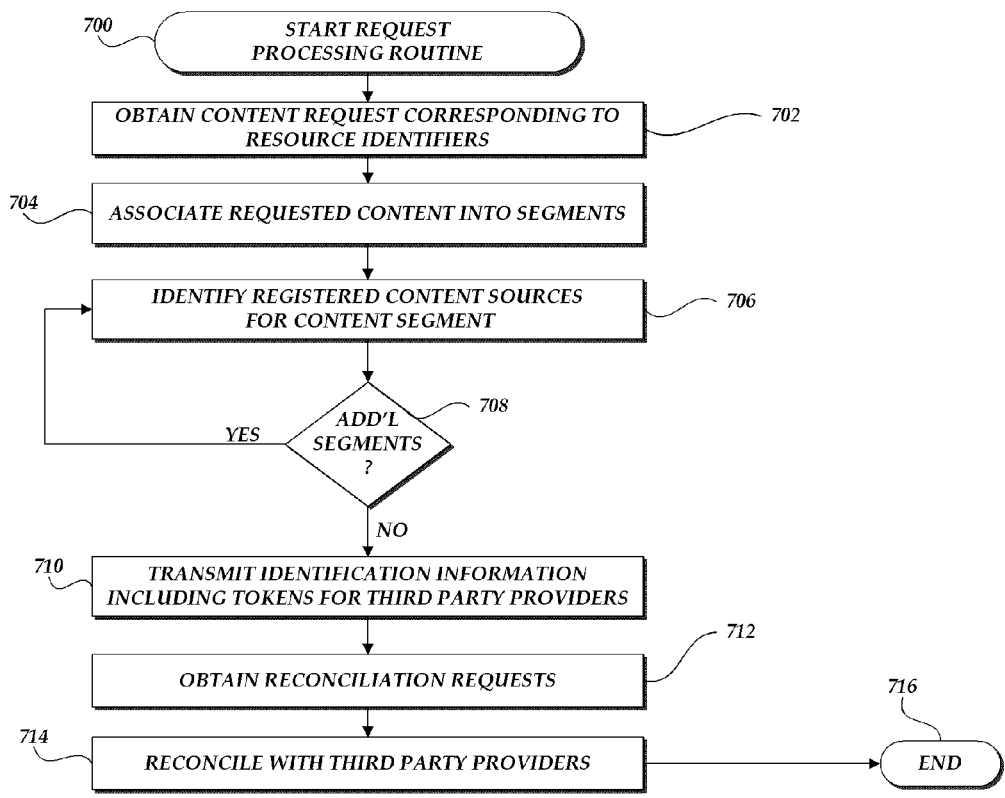
FIG. 7 is a flow diagram illustrative of a request routing routine implemented by a content provider.

With reference now to FIG. 7, one embodiment of a content request processing routine 700 implemented by the content provider 104 for processing a resource request from a client computing device 102 will be described. At block 702, the content provider 104 receives a content request from the client computing device 102. As previously described, the embedded URLs can correspond to content to be requested in conjunction with a Web page provided by the content provider 104. In an illustrative embodiment, the client computing device 102 may correspond to client/content source in the distribution network topology.

At block 704, the content provider 104 associates the requested content into one or more content segments. As previously described, the requested content can be subdivided into a number of content segments or content chunks utilizing a variety of methodologies. At block 706, the content provider 104 identifies one or more client/content sources that can provide the requested content segment or content chunk. In an illustrative embodiment, the determination of which clients/content sources can be a function of the content previously provided by the content provider 104. Additionally, or alternatively, the determination of which third party content providers 134 and/or resource cache components can be a function of network proximity. In an illustrative embodiment, the network proximity can be defined in terms of a determination of the minimal number of content distribution nodes that the requested content would traverse between the client computing device and the potential content source. At decision block 708, a test is conducted to determine whether additional resource segments exist. If so, the routine 700 returns to block 706 for an identification of additional client/content sources for the additional resource segments. One skilled in the relevant art will appreciate, however, that routine 700 may be implemented in a manner such that the content provider 104 identifies third party content providers 134 and/or resource cache components for the requested content as a whole and not for content segments.

Once all the appropriate client/content sources have been identified, at block 710, the content provider 104 transmits identification and appropriate reconciliation information (e.g., electronic tokens) responsive to the client computing device 102 request. As previously described, the identification information may be in the form of a list or as metadata that can be processed by the client computing device.

In the event that one or more of the client/content sources corresponds to third party content provider 134, at block 712, the content provider 104 obtains reconciliation requests from one or more third party content providers 134. For purposes of this illustrative embodiment, it is assumed that the client computing device 102 has been successful in obtaining at least one content segment or content chunk from a third party content provider 134. As previously discussed, the third party content providers 134 may transmit the reconciliation requests upon completion of a content segment download to a client computing device 102 or alternatively, asynchronously, such as in a batch processing. The reconciliation requests can also include additional metric information or utilization information collected by the third party content provider 134 in processing the resource request from the client computing device 102.

At block 714, the content provider 104 reconciles with the third party content providers 134. As previously disclosed, the content provider 104 can reconcile in a variety of manners. In one example, the content provider 104 may credit a financial institution account associated with the third party content provider 134 or cause such an account to be credited. In another example, the content provider 104 may interface with a network resource, such as Web service or Web site, to have a credit provided to an account or profile associated with third party content provider 134 (e.g., a rewards program). In still another example, the content provider 104 may increment tracking information that tracks the transaction information. Such tracking information may be utilized by either the content provider 104 or the third party content provider 134 at a later date. At block 716, the routine 700 terminates.

Figure 8:
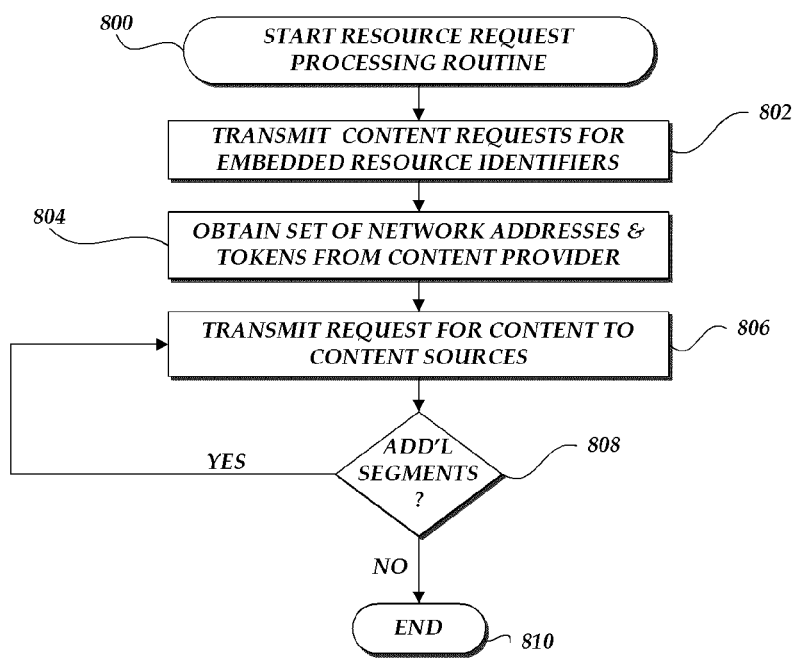
FIG. 8 is a flow diagram illustrative a resource request processing routine implemented by a client computing device for generating content requests to a content source corresponding to a subnetwork of a content provider distribution network.

With reference now to FIG. 8, a request routing processing routine 800 implemented by a client computing device 102 will be described. At block 802, the client computing device 102 transmits a content request to the content provider 104. As previously stated, in an illustrative embodiment, the content request corresponds to the processing of embedded URLs in content (e.g., a Web page) provided by the content provider 104. At block 804, the client computing device 102 obtains a set of network addresses from the content provider 104 in resolution of the DNS query content provider 104 that are responsive to the client request. As previously described, the set of network addresses corresponds to an identification of client/content sources that can process the resource request from the client computing device 102. Additionally, the set of network addresses may be prioritized or filtered based of the network proximity of the potential content sources to the client computing device. As previously discussed, in an illustrative embodiment, the requested content can be divided into various content segments or content chunks. Accordingly, the set of network addresses can be specified for each identifiable content segment or content chunk or alternatively, for the cumulative set of content segments/chunks.

At block 806, the client computing device 102 transmits a request for content to the identified content sources in the set of network addresses. Additionally, the request for content can include the additional reconciliation information that will be utilized by the third party content provider 134 to reconcile with the content provider 104. At decision block 808, a test is conducted to determine whether additional content segments are to be requested. If so, the routine 800 returns to block 806 for request of the content from the content sources. If not, or if the content is otherwise not able to be segmented, the routine terminates at block 810.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing content, the system comprising:
at least one computing device for receiving a request for content from a client computing device, wherein the at least one computing device is associated with a distribution network, wherein the distribution network includes a plurality of subnetworks, and wherein each subnetwork in the distribution network includes a source of the requested content within the subnetwork, the at least one computing device configured to:
identify a subnetwork in the distribution network for providing the requested content based on a network locality of the client computing device relative to subnetworks in the distribution network;
identify a content source in the identified subnetwork corresponding to a registered content provider for providing the requested content; and
provide identification information responsive to the request for content from the client computing device, wherein the identification information includes network address information of the identified content source.

2. The system as recited in claim 1, wherein the at least one computing device is further configured to distribute the requested content so that the requested content is distributed among one or more content sources in each subnetwork in the distribution network.

3. The system as recited in claim 2, wherein distributing the requested content comprises distributing the requested content to one or more content sources in each subnetwork.

4. The system as recited in claim 2, wherein distributing the requested content comprises distributing the requested content to each subnetwork that does not already have one or more content sources including the requested content.

5. The system as recited in claim 1, wherein the identification information further includes reconciliation information to be provided to the identified content source in the identified subnetwork.

6. The system as recited in claim 5, wherein the at least one computing device is further configured to obtain from the identified source a reconciliation request, wherein the reconciliation request includes reconciliation information received by the identified content source from client computing devices.

7. The system as recited in claim 6, wherein the at least one computing device is further configured to reconcile the reconciliation request from the identified content source.

8. A system for managing content at a content provider, the system comprising:
at least one computing device associated with a distribution network for receiving a request for content from a client computing device, wherein the distribution network includes a plurality of subnetworks, wherein each subnetwork corresponds to two or more logically grouped nodes within the distribution network, and wherein each subnetwork includes a source of the requested content within the subnetwork, the at least one computing device configured to:
determine a content source from a subnetwork for providing at least a portion of the requested content to the client computing device such that the determined content source will minimize distribution node traffic between one or more parent nodes to the client computing device and the content source; and provide identification information identifying the determined content source for providing at least a portion of the requested content, wherein the identification information includes network address information corresponding to the determined content source.

9. The system as recited in claim 8, wherein determining a content source for providing at least a portion of the content includes identifying at least one peer computing device for providing at least a portion of the requested content.

10. The system as recited in claim 9, wherein the at least one computing device is further operable to:
   obtain reconciliation requests from the peer computing device, wherein the reconciliation requests include reconciliation tokens received from client computing devices; and
   reconcile the reconciliation requests from the peer computing devices.

11. The system as recited in claim 8, wherein the at least one computing device is further configured to distribute the requested content so that the content is distributed among one or more content sources in each subnetwork in the distribution network.

12. The system as recited in claim 11, wherein distributing the requested content comprises distributing the requested content to one or more content sources in each subnetwork.

13. The system as recited in claim 11, wherein distributing the requested content comprises distributing the requested content to each subnetwork that does not have already have one or more content sources including the requested content.

14. A method for managing content, the method comprising:
   obtaining, at a computing device corresponding to a distribution network, a request for content from a client computing device, wherein the distribution network includes a plurality of subnetworks, and wherein each subnetwork in the distribution network includes a source of the requested content within the subnetwork;
   identifying a subnetwork in the distribution network for providing the requested content based on a network locality of the client computing device relative to subnetworks in the distribution network;
   identifying a content source in the identified subnetwork corresponding to a registered content provider for providing the requested content; and
   providing identification information responsive to the request for content from the client computing device, wherein the identification information includes network address information of the identified content source.

15. The method as recited in claim 14 further comprising distributing the requested content so that the requested content is distributed among one or more content sources in each subnetwork in the distribution network.

16. The method as recited in claim 15, wherein distributing the requested content comprises distributing the requested content to one or more content sources in each subnetwork.

17. The method as recited in claim 15, wherein distributing the requested content comprises distributing the requested content to each subnetwork that does not already have one or more content sources including the requested content.

18. The method as recited in claim 14, wherein the identification information further includes reconciliation information to be provided to the identified content source in the identified subnetwork.

19. The method as recited in claim 18 further comprising obtaining from the identified source a reconciliation request, wherein the reconciliation request includes reconciliation information received by the identified content source from client computing devices.

20. The method as recited in claim 19 further comprising reconciling the reconciliation request from the identified content source.

21. A method for managing content, the method comprising:
   obtaining, at a computing device corresponding to a distribution network, a request for content from a client computing device, wherein the distribution network includes a plurality of subnetworks, wherein each subnetwork corresponds to two or more logically grouped nodes within the distribution network, and wherein each subnetwork includes a source of the requested content within the subnetwork;
   determining a content source from a subnetwork for providing at least a portion of the requested content to the client computing device such that the determined content source will minimize distribution node traffic between one or more parent nodes to the client computing device and the content source; and
   providing identification information identifying the determined content source for providing at least a portion of the requested content, wherein the identification information includes network address information corresponding to the determined content source.

22. The method as recited in claim 21, wherein determining a content source for providing at least a portion of the content includes identifying at least one peer computing device for providing at least a portion of the requested content.

23. The method as recited in claim 22 further comprising:
   obtaining reconciliation requests from the peer computing device, wherein the reconciliation requests includes reconciliation tokens received from client computing devices; and
   reconciling the reconciliation requests from the peer computing devices.

24. The method as recited in claim 21 further comprising distributing the requested content so that the content is distributed among one or more content sources in each subnetwork in the distribution network.

25. The method as recited in claim 24, wherein distributing the requested content comprises distributing the requested content to one or more content sources in each subnetwork.

26. The method as recited in claim 24, wherein distributing the requested content comprises distributing the requested content to each subnetwork that does not have already have one or more content sources including the requested content.

* * * * *